G. F. KREBS.
AUTOMOBILE SIGNAL DEVICE.
APPLICATION FILED JUNE 12, 1920.
1,378,036.
Patented May 17, 1921.
2 SHEETS—SHEET 1.
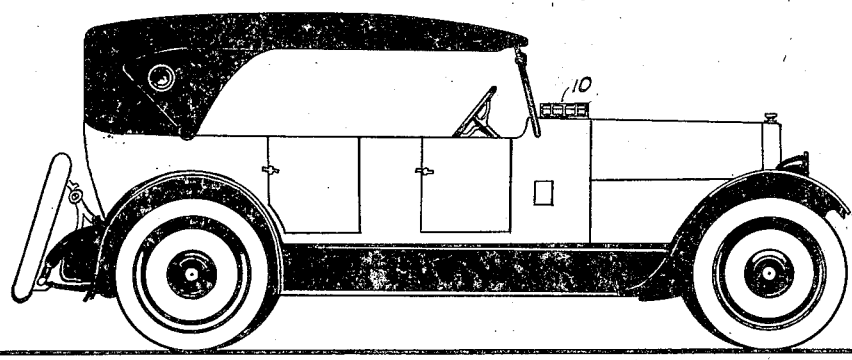
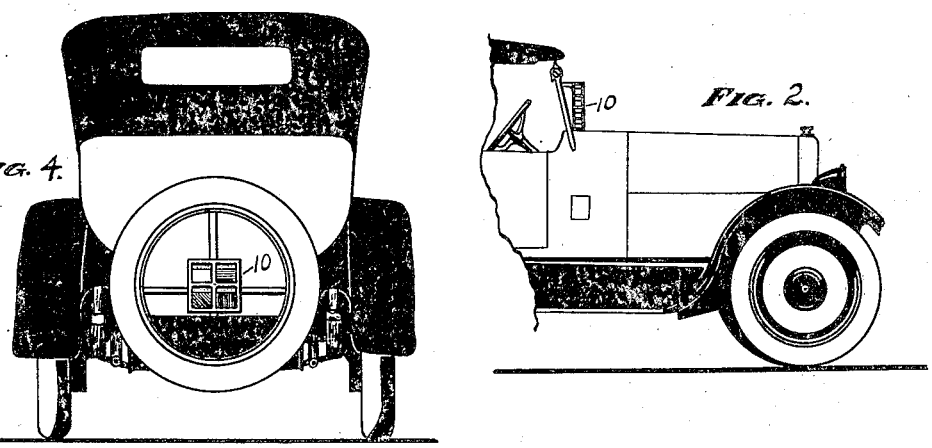
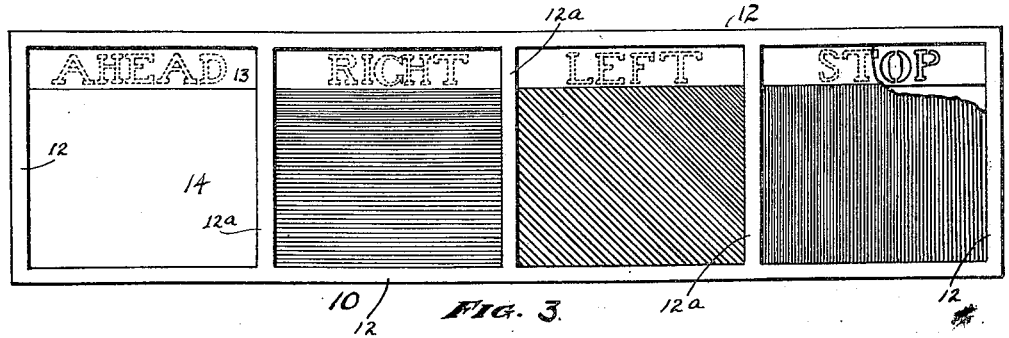
WITNESS:
INVENTOR
George F. Krebs
BY
ATTORNEY G. F. KREBS.
AUTOMOBILE SIGNAL DEVICE.
APPLICATION FILED JUNE 12, 1920.
1,378,036.
Patented May 17, 1921.
2 SHEETS—SHEET 2.
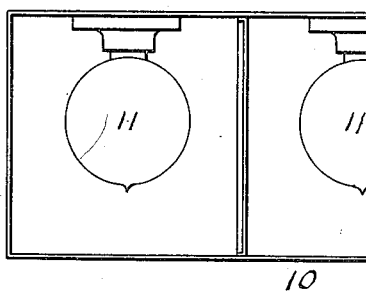
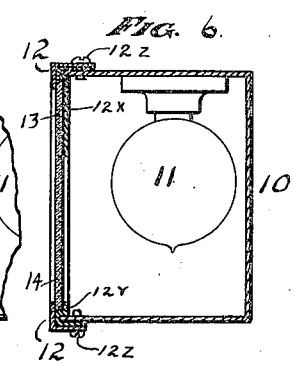
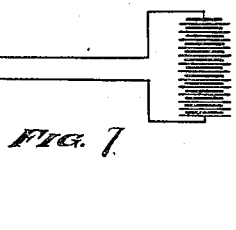
WITNESS:
INVENTOR
George F. Krebs
BY
E. G. Charles
ATTORNEY

UNITED STATES PATENT OFFICE.

GEORGE F. KREBS, OF WICHITA, KANSAS.

AUTOMOBILE SIGNAL DEVICE.

1,378,036. Specification of Letters Patent. Patented May 17, 1921.

Application filed June 12, 1920. Serial No. 388,538.

*To all whom it may concern:*

Be it known that I, GEORGE F. KREBS, a citizen of the United States, residing at Wichita, in the county of Sedgwick and State of Kansas, have invented certain new and useful Improvements in an Automobile Signal Device, of which the following is a description, referring to the drawings with this specification.

The invention relates to an electric signal arrangeable both on the rear of a motor car and in front of the windshield thereof; and to a control of the desired signaling mechanism by the driver of the car.

In the drawings, Figure 1 shows a side elevation of a motor car and illustrates the plural signal device vertically disposed in a horizontal series upon the cowl, forward of the windshield. Fig. 2 is a fragmentary side view of a motor car in which the plural signal device is vertically arranged in a vertical series, forward of the windshield. Fig. 3 is a detail front view of the light case, showing the different colors of glass as employed, and by a broken away portion at the right of the drawing, illustrating the double pane feature of the invention. Fig. 4 is a rear view of a motor car showing the signal compartments assembled in a square as a modification of the arrangement in series shown in Figs. 1, 2 and 3. Fig. 5 is a fragmentary view of the light case employed in Fig. 3, the panes of glass being removed to show the position of the electric bulbs. Fig. 6 represents a vertical section taken through a lamp compartment of the case seen in Fig. 3 to show the position of the bulb behind the glass pane. Fig. 7 is a wiring diagram applicable to either the rear lights or those in front of the windshield. Similar numerals of reference indicate corresponding parts throughout the drawings.

Referring to the drawings, 10 represents the case of the device, preferably of sheet metal, and contains the electric bulbs and glass for signaling purposes. The shape of the case 10 seen in Figs. 1, 2, 3, 5 and 6 is rectangular, giving a plurality of compartments arranged in series from left to right or vice versa. From the top of each compartment depends an electric bulb 11, each in an individual circuit as later explained. The exposed face of each compartment is provided with a rim 12 which incloses and retains glass panes, a narrow pane 13 at the top and a larger or square pane 14 at the bottom. The rim 12 is preferably of sheet metal and includes side division bars $12^a$ as seen in Fig. 3. In Fig. 6, included between the rim 12 and the edge of the case 10 are seen metal strips $12^x$ and $12^y$ which are bent around the edges of the case 10; the inner edges of these strips extend inwardly for a distance as back supports for the glass panes included between them and the outer rim portions 12. Screws $12^z$ as in Fig. 6 preferably secure the assemblage. The inner edge of the several strips $12^x$ are perforated like a stencil, each having a different word such as Ahead, Right, Left and Stop. The lower panes 14 are of clear or colored glass as desired. I prefer to make the lower pane under Ahead of clear glass, the pane under Right of blue glass, the pane under Left of green glass and the pane under Stop of red glass. The names and colors however may be varied to suit the demand. If desired the bulbs may be properly colored to correspond. As seen in Fig. 3, the glass panes 13 of the several compartments are each of clear glass and with the abutting lower panes 14 effectually seal the case. The adoption of a different colored pane 14 to identify each individual change in direction is of great advantage and will when universally adopted greatly minimize the likelihood of motor accidents. The clear glass 13, while protecting the portion $12^x$, permits of maximum illumination through the stenciled word, which remains for signaling purposes even though the lower pane 14 be broken.

A switch block 15 is preferably placed on the dashboard; the circuit to each compartment is independently closed by the proper switch whereby the driver's intentions regarding his operation or direction of travel is immediately signaled to others. It is obvious that corresponding compartments in the front and rear devices can be wired in the same circuit. Modifications may be employed within the scope of the appended claims.

I claim;

1. An automobile signal device comprising a case composed of a plurality of compartments, an electric bulb in each compartment, each bulb being in an individual lighting circuit and a circuit closer in said circuit; the exposed face of each compartment having glass retaining rim portions and two glass panes lying contiguous one another in the same plane, immediately behind said rim portions; and backing supports secured to said case and arranged within such compartment against said glass panes to secure said paired panes against such rim portions so as to effectually seal the compartment; one of said backing supports being perforated to provide a stenciled signal, said support being coextensive with one pane in the paired combination, the other pane being uncovered by the backing supports and giving a signal corresponding to the stenciled signal.

2. An automobile signal device comprising a case composed of a plurality of compartments, an electric bulb in each compartment, each bulb being on an individual lighting circuit and a circuit closer in said circuit; the exposed face of each compartment having glass retaining rim portions and two glass panes lying contiguous one another in the same plane, immediately behind said rim portions; and backing supports secured to said case and arranged within such compartment against said glass panes to secure said paired panes against such rim portions so as to effectually seal the compartment, one of said backing supports being perforated to provide a stenciled signal, said support being coextensive with one pane in the paired combination, the other pane being uncovered by the backing supports; and giving a signal corresponding to the stenciled signal, the stenciled backing supports of the several compartments differing each from the other as to the signal stenciled thereon, the glass panes immediately in front of said stenciled supports being each of clear glass, while the other glass panes in the device differing each from the other in color, substantially as set forth.

GEORGE F. KREBS.

Witnesses:
J. P. RYAN,
M. Y. CHARLES.